Sept. 8, 1953

H. C. FRENCH 2,651,269

MOBILE DEHYDRATOR

Filed April 13, 1950

INVENTOR.
Henry C. French
BY
Morsell & Morsell
ATTORNEYS.

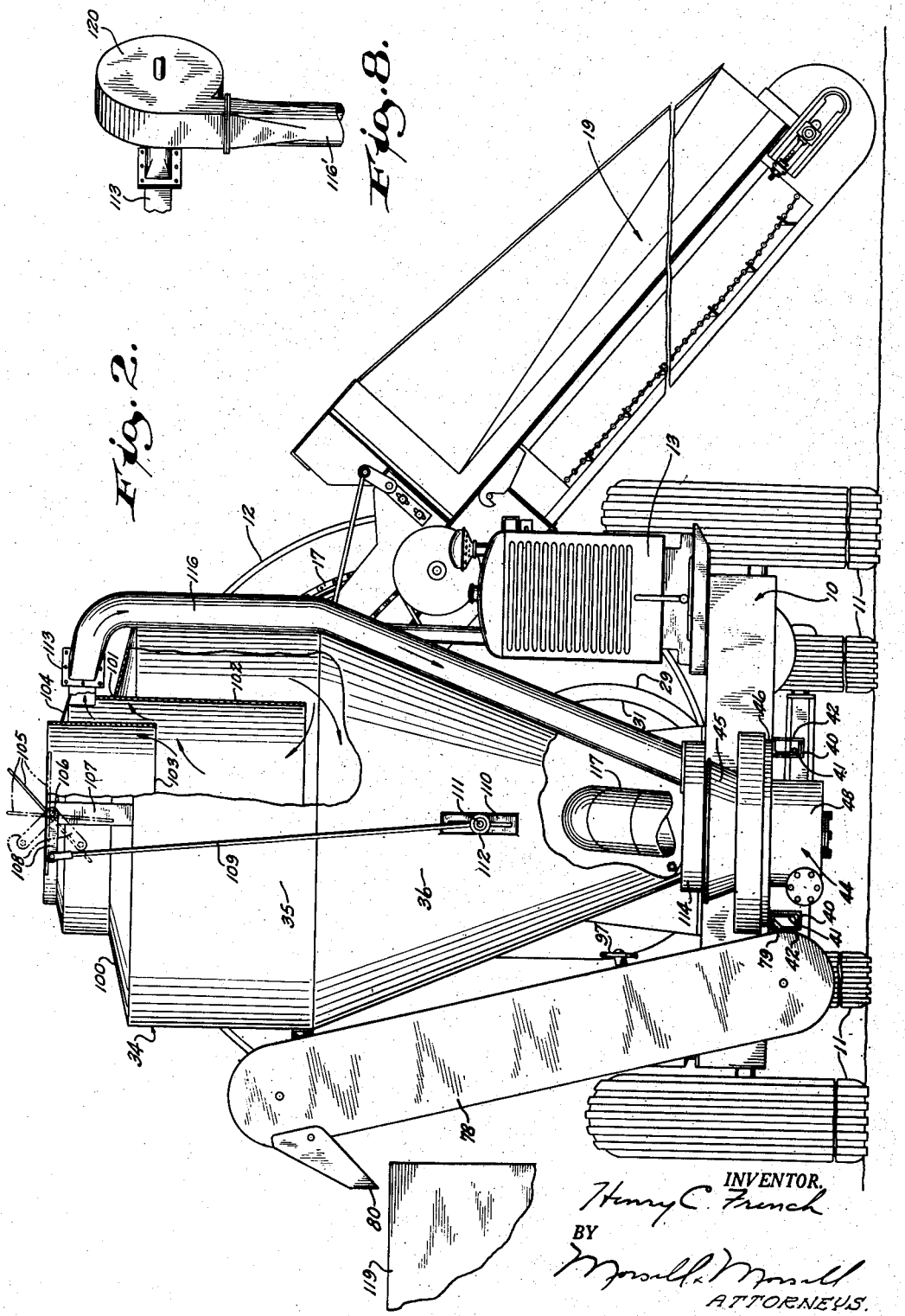

Sept. 8, 1953    H. C. FRENCH    2,651,269
MOBILE DEHYDRATOR
Filed April 13, 1950    3 Sheets-Sheet 3
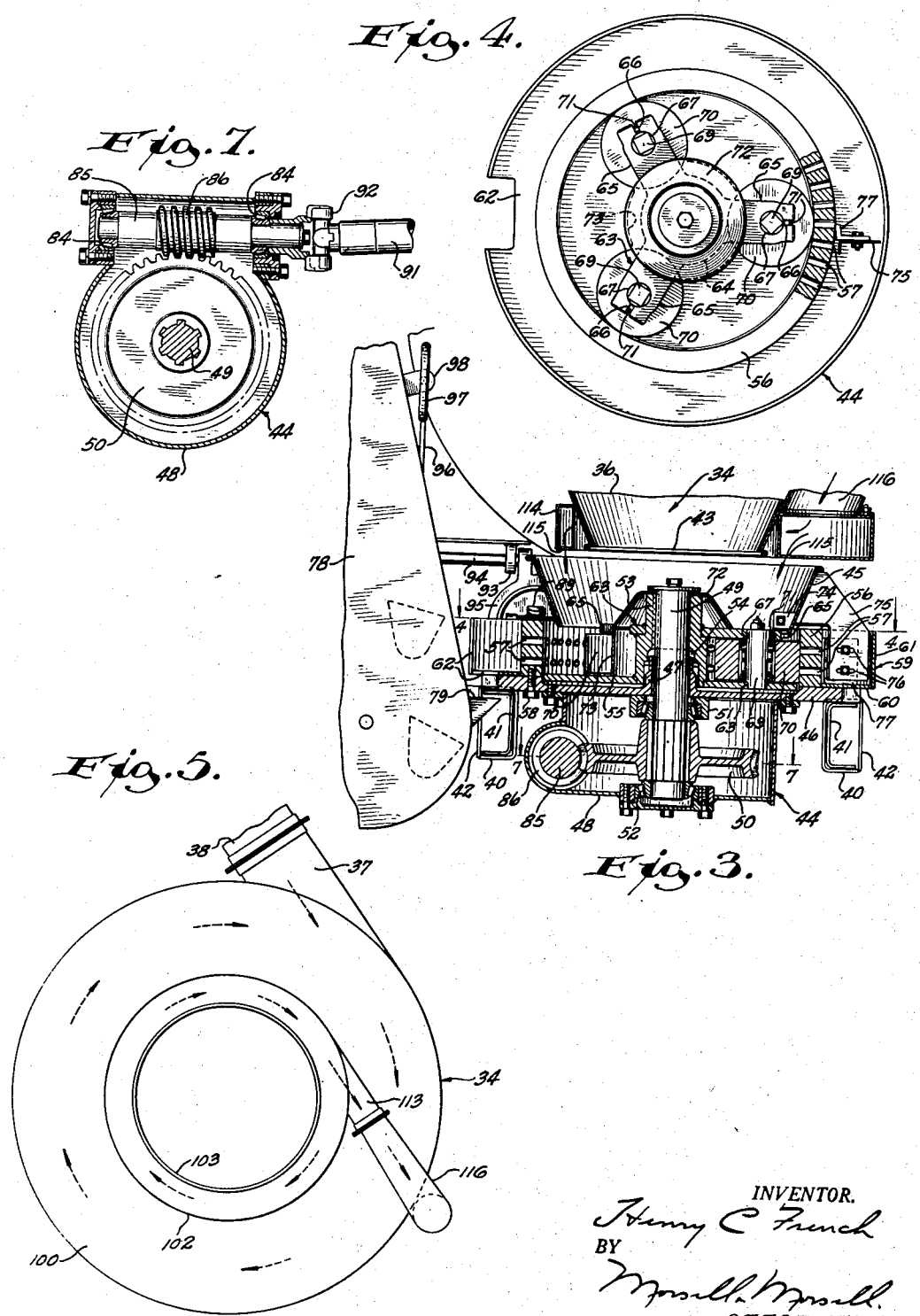
INVENTOR.
Henry C. French
BY
ATTORNEYS.

Patented Sept. 8, 1953

2,651,269

UNITED STATES PATENT OFFICE 2,651,269

MOBILE DEHYDRATOR

Henry C. French, Elm Grove, Wis., assignor to Arnold Dryer Co., Milwaukee, Wis., a corporation of Wisconsin Application April 13, 1950, Serial No. 155,709

18 Claims. (Cl. 107—4)

This invention relates to improvements in mobile dehydrators and more particularly to mobile dehydrators which include mechanism for forming the dehydrated product into pellets.

Dehydrators have heretofore been developed for the purpose of removing moisture from agricultural products such as forage crops, and the like. By performing dehydration while the crop is still in its freshly-cut green state most of the desirable qualities of the natural green crop, such as color, flavor, nutrient content, and vitamin content are retained.

The dehydrated product, as it is usually discharged from a dryer, is light in weight and is subdivided into relatively small particles which are difficult to handle. In addition, it has been found that upon prolonged exposure to air, the conventional dehydrated product loses a substantial amount of its natural green color, nutritive value, and vitamin content. It has, however, been discovered that if the product is subjected to the action of steam and pressure it can be formed into easy to handle pellets. When the dehydrated product is in pellet form, deterioration as a result of exposure to the air is greatly reduced, as the pellets have a smooth, relatively hard, skin-like outer surface which seals the interior of the pellet from the surrounding atmosphere. Furthermore, pelleting of the dehydrated product permits a slightly higher amount of moisture to be left in the product without detrimental effect, and, in addition, the normal cylindrical shape of the pellets permits circulation of cooling air therebetween during storage to minimize the danger of spontaneous combustion.

In the past, the standard practice has been to use a mobile type dehydrator operating in the field, and to transport the dehydrated product from the mobile dehydrator to a pelleting machine. Since a pelleting operation requires the use of steam or other moisture laden gas, pelleting machines, as heretofore designed, have been a part of a fixed installation including a rather substantial boiler set-up as well as a source of power for the pelleting device.

It is a principal object of the present invention to provide an improved mobile dehydrator wherein there is means for forming the dehydrated product into pellets before the product is discharged from the machine, thereby eliminating the necessity of handling the dehydrated product in other than its final pellet form, and thereby also reducing the deterioration of the product by preventing exposure to the atmosphere before it is in pellet form.

A further object of the invention is to provide an improved dehydrator of the class described wherein the hot gases and/or steam and fines (which have heretofore been expelled from the dehydrator into the atmosphere as waste) are directed into the pelleting device, thereby providing an adequate source of heat and moisture for the pelleting operation without resort to a separate source of steam, and at the same time increasing the output of the improved dehydrator by the amount of the fines recovered.

A further, more specific object of the invention is to provide an improved dehydrator of the class described wherein the pelleting device is driven by the same source of power which drives the rotating drum of the drier.

A further object of the invention is to provide an improved dehydrator of the class described having a centrifugal separator into which the dehydrated product is blown and having a pelleting device positioned below said separator in a position to receive the dehydrated product therefrom, the pelleting device being slidably mounted to permit it to be moved to an offset position where it can be cleaned out, adjusted, or repaired.

A further object of the invention is to provide an improved dehydrator of the class described wherein the driving connection for the pelleting device has incorporated therein a pair of splined, telescopically movable members which permit the pelleting device to be withdrawn from its normal operating position to the off-set position without disengaging said drive connection.

A further, more specific object of the invention is to provide an improved dehydrator of the class described wherein there is a centrifugal separator which is provided with a novel scavenging hood preferably equipped with a damper, said hood being operable to divert hot gases and/or steam and fines from the centrifugal separator into a conduit which delivers the steam and fines to the pelleting device.

A further object of the invention is to provide an improved dehydrator of the class described which is relatively simple in construction, which is efficient in operation, and which is otherwise well adapted for the purposes described.

With the above and other objects in view, the invention consists of the improved dehydrator, and all of its parts and combinations, as set forth in the claims, and all equivalents thereof.

In the drawings accompanying and forming a part of this specification, wherein are shown two forms of the invention, and wherein like characters of reference indicate the same parts in all of the views:

Fig. 1 is a fragmentary side elevational view of the rear end portion of the improved dehydrator, parts being broken away;

Fig. 2 is a fragmentary rear elevational view of the improved dehydrator, parts being broken away;

Fig. 3 is an enlarged fragmentary transverse vertical sectional view through the pelleting device and parts adjacent thereto looking from the rear;

Fig. 4 is a fragmentary sectional plan view taken approximately along the line 4—4 of Fig. 3, parts being broken away and shown in section;

Fig. 5 is a diagrammatic plan view of the centrifugal separator showing the flow of fluids therein;

Fig. 6 is a side elevational view of a fragment of the improved dehydrator with parts being broken away to show the drive connections to the pelleting device;

Fig. 7 is a sectional plan view taken approximately along the line 7—7 of Fig. 3; and Fig. 8 is a fragmentary elevational view showing a modified form of the invention.

Referring to Figs. 1 and 2 of the drawing, the numeral 10 indicates the main frame of the improved dehydrating machine, said frame being preferably supported on rubber-tired front and rear wheels 11. Suitably mounted for rotation on the frame 10 between the front and rear wheels 11 is a rotatable dehydrating drum 12. Mounted at the rear end of the frame 10 and on one side thereof is an internal combustion engine or other suitable source of power 13. The engine 13 has a clutch assembly 14 at its forward end from which projects a drive shaft 15 (see Fig. 6) which is suitably journalled adjacent its forward end. A manually operable clutch lever 18 also projects from the clutch housing 14. Fixedly mounted on the engine drive shaft 15 is a V-belt pulley 23.

Journalled for rotation on an axis extending longitudinally of the frame 10 and centrally thereof adjacent the rear wheels 11 is an intermediate shaft 24. Fixedly mounted on the shaft 24 is a pair of V-belt pulleys 25 and 26. At its forward end the shaft 24 is drivingly connected to the rotor 28 of a relatively large centrifugal blower having a housing 29. At its rear end the shaft 24 is drivingly connected to the rotor 30 of a smaller centrifugal blower having a housing 31. The intermediate shaft 24 is driven by the engine 13 through a plurality of V-belts 32 which drivingly connect the pulleys 23 and 26.

Referring to Fig. 6, a rotatable shaft 81 extends longitudinally of the frame 10 on the opposite side of said frame from the engine drive shaft 15 and is supported in suitable bearings. A V-belt pulley 82 is fixed on the shaft 81, and said shaft is driven by the pulley 25 through a plurality of V-belts 83 which drivingly connect the pulleys 25 and 82. Keyed onto the forward end of the shaft 81 is a sprocket 16, and an endless chain 17, which is driven by the sprocket 16, extends around and drives a suitable sprocket formed on the rear end of the rotatable drum 12.

Extending transversely downwardly and outwardly from one side of the machine, forwardly of the engine 13 and rearwardly of the drum 12 is an endless chain feed conveyor assembly 9 which discharges at its upper end into a screw conveyor 20, the latter extending forwardly and axially into the drum 12. The feed conveyor 19 may be driven by an endless chain 21 which, in turn, may be driven by a sprocket 22 fixedly mounted on the shaft 81, as shown in Fig. 6.

Suitably mounted at the rear end of the frame 10 is a centrifugal separator 34 having a cylindrical portion 35 and having a conical bottom wall portion 36. The conical bottom wall 36 is formed at its lower end with a discharge opening 43, as is clearly shown in Fig. 3. A tangential inlet duct connection 37 is formed in the cylindrical portion 35 adjacent the upper end thereof, and an arcuate duct 38 affords communication between the connection 37 and the outlet (not shown) of the blower housing 29. A duct 39 affords communication between the interior of the rotating drum 12 and the inlet of the blower housing 29, as shown in Fig. 1.

Extending longitudinally rearwardly from the underside of the rear end of the frame 10 is a pair of spaced, parallel, horizontal channel members 40. Positioned slidably within each of the channel members 40 and telescopically associated therewith is a channel member 41. A retaining plate 42 may be used to close the open side of each of the channels 40, as is clearly shown in Figs. 1, 2 and 3. Mounted on the rear ends of the channels 41 is a pelleting device 44 having a funnel-shaped receiving hopper 45 projecting upwardly therefrom. The pelleter 44 is normally positioned immediately below the opening 43 of the separator 34, with the hopper 45 normally in axial alinement with the separator 34. By reason of the telescopic connection between the channels 41 and the channels 40, the pelleting device 44 may be slid rearwardly from its normal position, shown in solid lines in Fig. 1, to an offset position as shown in dot and dash lines in Fig. 1. The purpose of this movable mounting will be hereinafter pointed out.

The pelleting device 44 comprises a horizontal base plate 46 which is fixedly supported on the rear ends of the channels 41. The plate 46 is formed with a bored, upstanding central boss 47, and bolted to the underside of said plate is a cylindrical gear housing 48. A vertical shaft 49 extends within the housing 48 and through the boss 47, and has fixed thereto within said housing a worm wheel 50. The shaft 49 is suitably journalled in bearings 51 and 52 in the housing 48 and above and below the gear 50 respectively, as shown in Fig. 3. A generally cylindrical hub 53 is fixed to the upper end of the shaft 49, said hub being recessed at its lower end, as at 54, to accommodate the boss 47 of the base plate 46. A disc 55 is centrally apertured and the lower end of the hub 53 is positoined in said aperture and fixed, as by welding, to said disc. Mounted on the upper surface of the plate 46 is an annular cylindrical die ring 56 which is formed with a plurality of radially extending apertures 57 which may be of uniform diameter. The die 56 is preferably readily removably mounted on the plate 46, as by suitable bolts 58 which extend upwardly through and into the plate 46.

Mounted on the upper surface of the plate 46 and surrounding the die 56 is an annular pellet receiving trough 59. The trough 59 is angular in cross-section, having a horizontal annular plate portion 60 projecting outwardly from the die 56, and having a vertical tubular portion 61 projecting upwardly from the outer margin of the annular plate 60. The trough 59 has a portion of its side wall 61 and bottom wall 60 cut out as at 62.

Fixed to the hub 53 in a position spaced above and parallel with the plate 55 is a plate 63 (see Figs. 3 and 4) formed with a central hub 64, and preferably having three equally spaced radially extending arms 65. The outer ends of the arms 65 are slotted as at 66, and said arms are each formed with an aperture 67 inwardly from the ends thereof and communicating with the slot 66.

The plate 55 is formed with apertures 68 in vertical alinement with the apertures 67, and mounted in the apertures 68 and 67 are vertical shafts 69. The shafts 69 are each formed with an eccentric intermediate portion on which a roller 70 is rotatably mounted. A locking screw 71 connects the bifurcated outer ends of the arms 65 and holds the shaft 69 in a selected position. The shafts 69 are formed with squared upper ends, as shown, to permit adjustment thereof, rotation of said shafts being adapted to cause radial movement of the rollers 70 relative to the shaft 49. A frusto-conical deflector 72 is positioned over the upper end of the hub 53 and extends downwardly and outwardly to the plate 63, the deflector having portions 73 depending from the outer margin thereof between the rollers 70, as is clearly shown in Figs. 3 and 4.

The funnel-shaped receiving hopper 45 previously referred to is supported on the outer ends of the arms 65 by suitable brackets 74, and is rotatable with said arms about the axis of the shaft 49. A bracket 75 projects outwardly from the outer surface of the hopper 45 and downwardly into the trough 59, as shown in Fig. 3. The bracket 75 is formed with a pair of transverse slots 76, and there is a cut-off knife or scraper 77 which is bolted to the bracket 75 through the slots 76. The knife 77 is adjustably positioned to scrape the outer wall of the die 56 at the outer ends of the apertures 57 during rotation of the hopper 45.

Referring to Figs. 2 and 3, a bucket elevator 78 is mounted adjacent the centrifugal separator. The housing of the bucket elevator 78 is formed with a pellet-receiving mouth 79 positioned under the cutout portion 62 of the trough 59. The housing of the elevator 78 is also formed with a discharge spout 80 adjacent its upper end, and the bucket elevator is positioned to discharge material from the spout 80 transversely outwardly into an adjacent bin or vehicle 119. The bucket elevator 78 may be of any suitable conventional type, and the dotted lines in Fig. 3 indicate a pair of elevator buckets, the lower one being in a position to receive material from the mouth 79.

Referring to Figs. 3 and 7, the gear housing 48 is formed with suitable bearings 84 for rotatably supporting a short shaft 85. The shaft 85 has a central portion formed with worm gearing 86 which gearing drivingly engages the teeth of the worm wheel 50. The shaft 85 preferably extends longitudinally of the frame 10, and at its forward end projects exteriorly of the housing 48, as shown in Figs. 6 and 7. A clutch 87 is connected to the rear end of the shaft 81 adjacent a transverse frame member 88, and said clutch is provided at its rear end with a universal joint 89. Projecting rearwardly from the universal joint 89 is an exteriorly splined drive member 90, and telescopically associated with the drive member 90 is an interiorly splined drive member 91, having its rear end connected to the forward end of the shaft 85 through a universal joint 92.

Mounted on the transverse frame member 88 is a supporting bracket 93, on which a transverse shaft 94 is pivotally supported. A clutch yoke 95 is keyed or otherwise fixed to the shaft 94, and a clutch operating lever 96 is likewise keyed or otherwise fixed to the shaft 94, extending upwardly and rearwardly therefrom. A longitudinally extending push rod 97 is suitably mounted for longitudinal sliding movement, as in the bracket 98 on the housing of the bucket elevator 78 (see Figs. 2, 3 and 6). The push rod 97 is preferably formed with a handle 99 at its rearward end, and is pivotally connected at its forward end to the free end of the clutch operating lever 96, as shown. It is apparent that the pelleting device 44 is driven by the engine 13, and that said device can be slid from its normal position to the dot and dash line position shown in Fig. 1, without disengaging the driving connections to the pelleting device. When the pelleting device is moved rearwardly to its offset position, the telescopically associated drive members 90 and 91 merely slide apart without becoming disengaged, and the drive connection is maintained, even when the pelleting device is in its rearmost offset position.

Referring to Figs. 1 and 2, the centrifugal separator 34 is formed with a circular top plate 100 having a central circular aperture 101 therein. Positioned in the aperture 101, preferably extending a short distance above and a substantial distance below the plate 100, is a vertical sleeve 102 which is coaxial with the separator 34.

Positioned adjacent the upper end of the sleeve 102 and coaxial therewith is a relatively short sleeve 103. An annular plate 104 extends between the upper end of the sleeve 102 and the sleeve 103 and sealingly connects said sleeves. A circular damper 105 is fixed to a rod 106 which extends diametrically across the upper end of the sleeve 103 and is pivotally supported by said sleeve. The sleeves 102 and 103, the plate 104 and the damper 105 form a scavenging hood for the separator 34. The rod 106 extends longitudinally, and projects rearwardly from the sleeve 103 through a supporting bracket 107 mounted on the upper surface of the plate 100. A lever 108 is fixed to the rod 106 rearwardly of the bracket 107, and a rod 109 is pivotally connected to the free end of the arm 108, projecting downwardly therefrom.

A slotted bracket 110 is mounted on the conical wall 36 of the separator 34 adjacent the lower end of the rod 109, and an adjustment bolt 111, having a handle 112, adjustably connects the lower end of the rod 109 to the slotted bracket 110 to permit selective positioning of the damper 105 to suit requirements. The extreme positions of adjustment of the damper 105 are shown in Fig. 2 in dot and dash lines.

The sleeve 102 is formed adjacent its upper end with a tangential duct connection 113. An annular duct 114 surrounds the lower end of the centrifugal hopper 34 and is spaced above the receiving hopper 45 substantially the same distance as the lower end of the separator 34. The annular duct 114 is formed, preferably on its underside, with a plurality of equally spaced apertures 115 which are positioned to direct fluid from the duct 114 into the receiving hopper 45 in the manner indicated by the arrows in Fig. 3. A conduit 116 affords communication between the scavenging hood and the annular duct 114, as shown in Figs. 1 and 2.

Operation

The material to be dehydrated is deposited on the feed conveyor 19 which feeds said material upwardly and inwardly to the screw conveyor 20. The screw conveyor 20, in turn, feeds the material forwardly and axially into the rotating drum 12. As the material passes through the drum 12 moisture is removed therefrom and is picked up by the hot gases normally flowing through said drum. These hot gases become moisture laden, and a certain amount of said moisture may be converted into steam due to the heat in the drum 12 which may be supplied by an oil burner, as is customary in the art. For the purposes of this description the hot moisture laden gases and/or steam will be referred to only as moisture laden gases.

The material dehydrated in the drum 12, together with the moisture laden gases from said drum, is conducted into the inlet of the blower housing 29 through a conduit 39. The dehydrated product and said gases are then blown into the centrifugal separator 34 through the conduit 38 and the tangential connection 37. As shown in Fig. 5, the incoming gases and dehydrated product follow a circular path within the separator 34 due to the tangential position of the inlet connection 37. The vortex thus created within the separator 34 separates the dehydrated material from the moisture laden gases, and the dehydrated material travels downwardly and out of the opening 43 at the lower end of the separator 34. Due to the fact that the damper 105 normally restricts the opening at the upper end of the sleeve 103, the moisture laden gases cannot escape freely through said opening and a back pressure is created. This causes a substantial portion of the moisture laden gases to flow upwardly between the sleeves 102 and 103, through the connection 113, and down the conduit 116 into the annular duct 114.

As the dehydrated material begins to issue from the lower end of the separator 34 and to drop into the annular receiver 45, the push rod 97 is pushed inwardly to engage the clutch 87 and cause rotation of the telescopic drive members 90 and 91 as well as rotation of the shaft 85. Rotation of the shaft 85, in turn, causes rotation of the worm wheel 50 and of the shaft 49. This causes rotation of the hub 53 and of the plates 63 and 55, as well as rolling contact of the rollers 70 with the inner surface of the annular die 56.

As the dehydrated product falls into the receiving hopper 45 (which rotates with the plate 63) it is subjected to the hot moisture laden gases which are being emitted from the holes 115 of the annular duct 114. In addition, the deflector 72 deflects the material outwardly into the path of the rollers 70. The rollers 70 force the dehydrated product into the passages 57 of the die 56 with a very high pressure. The combined effect of the hot moisture laden gases and of this roller pressure on the dehydrated product is to cause the particles of the dehydrated product to stick together and to be extruded from the outer ends of the passages 57 in rod-like form.

Since the annular receiving hopper 45 and the cut-off knife 77 rotate with the plate 63, the cut-off knife moves around the outer surface of the die 56 adjacent the apertures 57, and shears off the rod-shaped extrusions from the die 56 in the form of cylindrical pellets. The pellets drop into the pellet-receiving trough 59 ahead of the knife 77 and bracket 75, and are pushed in said trough ahead of said knife and bracket to the cut-out discharge opening 62 of said trough. The pellets drop through the opening 62 into the mouth 79 formed on the housing of the bucket elevator 78 and are directed into the buckets of said bucket elevator. The bucket elevator 78 delivers the pellets into the spout 80 and the latter discharges into a suitable receiving hopper or trailer adjacent thereto. Since the dehydrated product is subjected to the hot gases while in the improved machine, it follows that the pellets when discharged from the machine are still relatively warm.

An inlet conduit 117 having an open end communicates with the inlet opening of the blower housing 31, and a conduit 118 communicates with the discharge opening of said blower housing. The housing 31 and the rotor 30 therein constitute a cooling blower, and the discharge conduit 118 may be led to the receiving hopper or trailer 119 to direct cooling air from said blower onto the pellets discharged thereinto. Due to the cylindrical form of the pellets, sufficient air spaces are provided therebetween to permit circulation of the cooling air therein and to provide relatively rapid cooling thereof.

The improved dehydrating machine is a complete unit in itself. It eliminates the necessity of handling the dehydrated product prior to its being formed into pellets. The gasoline engine 13 provides all of the power necessary for operating the improved machine, and no outside source of power is necessary. Similarly, no outside source of steam or of moisture laden gas is necessary for the proper operation of the improved machine. The slidable mounting for the pelleting device 44 permits said device to be slid rearwardly to the offset dot and dash position thereof, shown in Fig. 1, and when said device is in this offset position it can be readily cleaned, its rollers can be readily adjusted, or the die 56 thereof may be readily changed.

The improved machine is very efficient for a number of reasons in addition to those which are obvious from the unitary nature of the machine. One of the reasons is that it uses the moisture laden gases which would otherwise be wasted. Another reason is that in using these moisture laden gases, fines of the dehydrated material which would otherwise also be discharged into the atmosphere and wasted, are recovered and incorporated into the pellets.

The telescopic drive connection for the pelleting device 44 greatly reduces the time required to make adjustments on or to clean out the pelleting device, due to the fact that when the pelleting device is moved to offset position the drive connection for said device need not be disassembled or separately adjusted in any way.

Fig. 8 shows a modified form of the invention designed to accomplish accelerated flow of the moisture laden gases to a pelleting device from a separator. In Fig. 8 the inlet connection of a centrifugal blower 120 is connected to the tangential connection 113', the same being identical with the tangential connection 113 of the preferred form of the invention. The outlet of the blower 120 is connected to the conduit 116', which is analogous to the conduit 116 in the preferred form of the invention.

Various other changes and modifications may be made without departing from the spirit of the invention, and all of such changes are contemplated as may come within the scope of the claims.

What I claim is:

1. In combination: a dehydrating machine having a drying unit and having discharge means connected to said unit which discharge means has a discharge opening for the dehydrated product and a discharge opening for moisture laden gases from said drying unit; a pelleting device positioned to receive the dehydrated product from said product discharge opening; and means including a conduit having an end connected to said discharge means for intercepting gases which have become moisture laden in said drying unit and for directing said moisture laden gases into said pelleting device.

2. In combination: a dehydrating machine having a rotatable drying unit and having discharge means connected to said unit and provided with a discharge opening for the dehydrated product; a rotatable pelleting device positioned to receive the dehydrated product from said product discharge opening; means connected to said discharge means for directing moisture laden gases from said drying unit into said pelleting device; and a common source of rotary motion on said machine for rotating said drying unit and said pelleting device.

3. In combination: a mobile dehydrating machine having a drying unit and having discharge means connected to said unit and provided with a discharge opening for the dehydrated product; a pelleting device mounted on said dehydrating machine and positioned to receive the dehydrated product from said product discharge opening; and means including a conduit having an end connected to said discharge means for intercepting gases which have become moisture laden in said drying unit and for directing said moisture laden gases into said pelleting device.

4. In combination: a dehydrating machine provided with a conical centrifugal separator having a bottom discharge opening for the dehydrated product and having an opening adjacent the top thereof for discharging moisture laden gases; a pelleting device positioned below the bottom discharge opening of said separator to receive the dehydrated product from said opening; and means including a conduit having an end positioned to intercept moisture laden gases from the separator adjacent said top opening and for directing said moisture laden gases into said pelleting device.

5. In combination: a dehydrating machine provided with a conical centrifugal separator into which the dehydrated product and moisture laden gases are normally directed, said separator having a bottom discharge opening for the dehydrated product; a pelleting device positioned below the bottom discharge opening of said separator to receive the dehydrated product from said opening; and means including a conduit having an end communicating with the interior of said separator in a manner to itercept gases in said separator and for directing said moisture laden gases into said pelleting device.

6. In combination: a dehydrating machine provided with a conical centrifugal separator having a bottom discharge opening for the dehydrated product and having an opening adjacent the top for discharging moisture laden gases, a scavenging hood adjacent said top opening, a pelleting device positioned below the bottom discharge opening of said separator to receive the dehydrated product from said bottom opening, and means including a conduit having an end communicating with said scavenging hood to intercept moisture laden gases therefrom and for directing said moisture laden gases into said pelleting device.

7. In combination: a mobile frame, a dehydrating machine on said frame having a rotatable drying unit and having discharge means at one end of said unit provided with a discharge opening for the dehydrated product and having a discharge outlet for moisture laden gases from said unit; a rotatable pelleting device mounted on said mobile frame and positioned to receive the dehydrated product from said product discharge opening, means connected to said discharge means for directing said moisture laden gases into said pelleting device; and a common source of rotary motion on said mobile frame for rotating said drying unit and pelleting device.

8. In combination: a mobile frame, a dehydrating machine on said frame having a rotatable drying unit and having discharge means at one end of said unit provided with a discharge opening for the dehydrated product and a discharge outlet for moisture laden gases from said unit; a rotatable pelleting device mounted on said mobile frame and positioned to receive the dehydrated product from said product discharge opening, means including a conduit having an end connected to said discharge means and positioned to intercept gases which have become moisture laden in said drying unit for directing said moisture laden gases into said pelleting device; and a common source of rotary motion on said mobile frame from rotating said drying unit and pelleting device.

9. In combination: a dehydrating machine having discharge means connected thereto which discharge means has a discharge opening for the dehydrated product; a source of power mounted on said dehydrating machine for driving the same; a pelleting device normally positioned adjacent said discharge opening for receiving the dehydrated product therefrom; a support for said pelleting device movably mounted on said machine and positioned to permit the pelleting device to be moved from its normal position to an offset position; and a driving connection between said source of power and said pelleting device, said driving connection including a pair of interconnected, relatively movable drive members maintaining a continuous driving connection throughout the rage of movement of said pelleting device.

10. In combination: a dehydrating machine having discharge means connected thereto which discharge means has a discharge opening for the dehydrated product; a source of power mounted on said dehydrating machine for driving the same; a pelleting device normally positioned adjacent said discharge opening for receiving the dehydrated product therefrom; a support for said pelleting device movably mounted on said machine and positioned to permit the pelleting device to be moved from its normal position to an offset position; and a driving connection between said source of power and said pelleting device, said driving connecting including a pair of splined, telescopically associated drive members maintaining a continuous driving connection throughout the range of movement of said pelleting device.

11. In combination: a dehydrating machine provided with a generally conical centrifugal separator into which the dehydrated product and moisture laden gases are normally directed, said separator having a top wall formed with an opening therein; a vertical sleeve positioned in said top wall and extending a substantial distance into said separator, said sleeve being formed with a side wall opening therein adjacent the upper end thereof; a second vertical sleeve of relatively short length extending concentrically within said first sleeve and spaced radially inwardly from the side wall opening in said first sleeve; an annular plate connecting the upper end portions of said first and second sleeves; and a conduit communicating with the side wall opening in the first sleeve for conducting moisture laden gases from said separator.

12. In combination: a dehydrating machine provided with a generally conical centrifugal separator into which the dehydrated product and moisture laden gases are normally directed, said separator having a top wall formed with an opening therein and having a bottom discharge opening; a pelleting device positioned to receive the dehydrated product from said opening; a vertical sleeve positioned in said top wall and extending a substantial distance into said separator, said sleeve being formed with a side wall opening therein adjacent the upper end thereof; a second vertical sleeve of relatively short length extending concentrically within said first sleeve and spaced radially inwardly from the side wall opening in said first sleeve; an annular plate extending between the upper end portions of said first and second sleeves; and a conduit communicating with the side wall opening in the first sleeve for conducting moisture laden gases from said separator to said pelleting device.

13. In combination: a dehydrating machine provided with a generally conical centrifugal separator into which the dehydrated product and moisture laden gases are normally directed, said separator having a top wall formed with an opening therein; a vertical sleeve positioned in said top wall and extending a substantial distance into said separator, said sleeve being formed with a side wall opening therein adjacent the upper end thereof; a second vertical sleeve of relatively short length having a top opening and extending concentrically within said first sleeve and spaced radially inwardly from the side wall opening in said first sleeve; an annular plate connecting the upper end portions of said first and second sleeves; a conduit communicating with the side wall opening in the first sleeve for conducting moisture laden gases from said separator; and a damper pivotally mounted in said second sleeve in a position to control said top opening.

14. In combination: a dehydrating machine provided with a centrifugal separator into which the dehydrated product and moisture laden gases are normally directed, said sepaartor having a conical bottom wall formed at its lower end with an opening for discharging the dehydrated product therefrom, and said separator also being formed with an opening adjacent the upper end thereof for discharging moisture laden gases therefrom; a pelleting device having an open upper end positioned immediately below and in alinement with the lower end opening of said separator to receive the dehydrated product discharged from the separator; an annular duct surrounding the lower end of said conical separator wall and positioned adjacent the open upper end of said pelleting device, said annular duct having apertures formed therein and positioned to direct moisture laden gases from said duct into the open upper end of the pelleting device; and means including a conduit having one end in communication with said annular duct and having its other end positioned to intercept moisture laden gases from the separator adjacent the upper end opening thereof for directing said moisture laden air into said annular duct.

15. In combination: a dehydrating machine provided with a centrifugal separator into which the dehydrated product and moisture laden gases are normally directed, said separator having a conical bottom wall formed at its lower end with an opening for discharging the dehydrated product therefrom, and said separator also being formed with an opening adjacent the upper end thereof for discharging moisture laden gases therefrom; a pelleting device having an open upper end positioned immediately below and in vertical alinement with the lower end opening of said separator to receive the dehydrated product discharged from the separator; an annular duct positioned adjacent the open upper end of said pelleting device, said annular duct having apertures formed therein positioned to direct moisture laden gases from said duct into the open upper end of the pelleting device; a movable support for said pelleting device positioned to permit said device to be moved from its normal position to a position in which it is offset from said separator lower end opening and from said annular duct; and means including a conduit having one end in communication with said annular duct and having its other end positioned to intercept moisture laden gases from the separator adjacent the upper end opening thereof for directing said moisture laden air into said annular duct.

16. In combination: a dehydrating machine provided with a centrifugal separator into which the dehydrated product and moisture laden gases are normally directed, said separator having a conical bottom wall having a vertical axis and formed at its lower end with an opening for discharging the dehydrated product therefrom, and said separator also being formed with an opening adjacent the upper end thereof for discharging moisture laden gases therefrom; a pelleting device having a funnel shaped upper end positioned coaxial with said conical wall and immediately below the lower end opening thereof to receive the dehydrated product discharged from the separator; an annular duct positioned adjacent and substantially coaxially with the funnel shaped upper end of said pelleting device, said annular duct having apertures formed therein positioned to direct moisture laden gases from said duct into the funnel-shaped upper end of the pelleting device; and means including a conduit having one end in communication with said annular duct and having its other end positioned to intercept moisture laden gases from the separator adjacent the upper end opening thereof for directing said moisture laden air into said annular duct.

17. In combination: a dehydrating machine provided with a separator into which the dehydrated product and moisture laden gases are normally directed, said separator having an opening for discharging the dehydrated product and also having an opening for discharging moisture laden gases; a pelleting device having an open upper end positioned adjacent the product discharge opening of said separator to receive the dehydrated product therefrom; an annular duct positioned adjacent the open upper end of said pelleting device, said annular duct having apertures which are positioned to direct moisture laden gases from said duct into the open upper end of the pelleting device; and a conduit having one end in communication with said annular duct and having its other end positioned to intercept moisture laden gases from the separator for directing said moisture laden gases into said annular duct and pelleting device.

18. In combination a dehydrating machine provided with a conical centrifugal separator, which separator has a discharge opening for the dehydrated product and has an opening adjacent the top for discharging moisture laden gases; a pelleting device positioned adjacent the discharge opening of the separator to receive the dehydrated product therefrom; and means including a conduit having an end positioned to intercept moisture laden gases from said top opening of the separator for directing said moisture laden gases into said pelleting device.

HENRY C. FRENCH.

References Cited in the file of this patent

UNITED STATES PATENTS

| Number | Name | Date |
|---|---|---|
| 748,893 | Trump | Jan. 5, 1904 |
| 1,567,031 | Buensod | Dec. 29, 1925 |
| 1,954,086 | Meakin | Apr. 10, 1934 |
| 2,038,008 | Shodron | Apr. 21, 1936 |
| 2,044,376 | Webster | June 16, 1936 |
| 2,113,047 | French | Apr. 5, 1938 |
| 2,156,212 | Wendt et al. | Apr. 25, 1939 |
| 2,168,797 | Havis | Aug. 8, 1939 |
| 2,241,546 | Evenstad et al. | May 13, 1941 |
| 2,318,576 | Arnold | May 11, 1943 |
| 2,319,674 | French et al. | May 18, 1943 |
| 2,341,101 | Howard | Feb. 8, 1944 |
| 2,423,747 | Zahm | July 8, 1947 |
| 2,431,623 | Siehrs | Nov. 25, 1947 |
| 2,513,813 | Milleville | July 4, 1950 |